United States Patent [19]
Hains

[11] Patent Number: 5,745,250
[45] Date of Patent: Apr. 28, 1998

[54] METHOD OF PRODUCING TINT DOTS WITH PAIRS OF HOLLADAY HALFTONES

[75] Inventor: Charles M. Hains, Altadena, Calif.

[73] Assignee: Xerox Corporation, Stamford, Conn.

[21] Appl. No.: 812,554

[22] Filed: Mar. 7, 1997

[51] Int. Cl.⁶ .................................................. H04N 1/40
[52] U.S. Cl. ........................... 358/298; 358/456; 358/465
[58] Field of Search ........................... 358/298, 456–460, 358/465, 466

[56] References Cited

U.S. PATENT DOCUMENTS

| | | | |
|---|---|---|---|
| 4,185,304 | 1/1980 | Holladay | 358/298 |
| 4,800,442 | 1/1989 | Riseman et al. | 358/298 X |
| 4,903,123 | 2/1990 | Kawamura et al. | 358/456 X |
| 5,598,204 | 1/1997 | Harrington | 358/298 X |
| 5,649,073 | 7/1997 | Knox et al. | 358/298 X |

Primary Examiner—Eric Frahm
Attorney, Agent, or Firm—Robert Cunha

[57] ABSTRACT

A halftone generator for generating tint dots that are more circular than typical Holladay dots. Two threshold arrays are used, one that is pixel-centered and one that is interstice-centered. For each signal input level, the one that will produce a more circular dot will be selected by a look-up table driven by the image signal input. A single array version can also be used. The stored array has pixel-centered thresholds at one end and interstice-centered thresholds at the other. The circuit can either choose an array output or an inverted array output to generate either pixel-centered or interstice-centered light and dark coverage.

4 Claims, 6 Drawing Sheets

METHOD OF PRODUCING TINT DOTS WITH PAIRS OF HOLLADAY HALFTONES

BACKGROUND OF THE INVENTION

An improved halftone process for producing tint dots using a combination to two threshold arrays and a small look up table to produce halftone dots that do not grow monotonically.

A printing system that prints pictorial images may contain a scanner of the original image which produces a digital image having a number of bits per pixel, a halftone generator which converts a number of pixels into a smaller number of halftone dots, and a printer for printing the dots. The original may also be a computer generated graphic.

U.S. Pat. No. 4,185,304, Electronic Halftone Screening, by T. Holladay, filed Jan. 22, 1980, describes the use of threshold arrays for generating halftone dots of arbitrary size, shape and screening angle, and is incorporated herein by reference.

Holladay halftoning employs a compact array of threshold values and a method of addressing into the array based on position on the page. The Holladay algorithm is the most compact form for description of a halftone dot. A property of Holladay halftoning is that the dot must grow monotonically, i.e., each larger dot or level contains the same pixels that were already "turned on" in the smaller dots. In the dot growth, once a bit is turned on it stays on for the remainder of the dot. Because of this, only one threshold is required for each pixel in the dot description. This characteristic is good for pictorial halftoning since each level is related to the others and there can be a smooth progression across a gray-scale gradation with minimal visual contouring. Because of the need for the levels to be related and because of the monotonic growth, some of the individual levels are not of an optimal shape. The patterns of some dots are not symmetric, and some may have noise-inducing odd-pixel appendages that in large flat image areas can give rise to xerographic defects or visual artifacts. The overall dot design is a compromise.

Tint dots, on the other hand, are specifically designed to stand alone. In particular, the patterns avoid as much as possible the usual checkerboard 50% level pattern where halftone dots touch each other, which a xerographic or ink jet printer will not handle consistently. In addition, dots that are more rounded are less noisy than dots with odd appendages. Therefore, the pattern at each level is separately optimized to be noise-free and symmetric. In particular, there is no point or level at which the dots touch. The dots are circular spots from the highlights through the midtones, and at some point the patterns become inverted and the shadows are circular white holes. The dot growth is not necessarily monotonic. A pixel that is turned on for one level may be turned back off for a larger level. Tint dots are usually used to improve the quality of synthetic graphics, business graphics and spot color, and have a cleaner appearance in large flat areas.

Prior to this invention, tint dots were stored as collections of individual bit-map patterns in large look-up tables, requiring considerably more memory than Holladay threshold arrays. Since it is desirable to utilize both kinds of dots in a digital imaging system, implementations have been designed with either both kinds of hardware present, or by implementing both the Holladay pictorial dots and tint dots in look up tables.

A considerable improvement would be the capability of using the simpler Holladay hardware to produce tint dots.

SUMMARY OF THE INVENTION

This halftone generation method consists of using two Holladay arrays instead of one. The first array would have dots that are roughly centered on an intersection, or interstice, between pixels. An example would be a square pattern of four pixels, centered on the point between pixels.

The second array would have dots that are roughly arranged around a central pixel. An example would be a five pixel dot where four adjacent pixels would be arranged around one central pixel.

Finally, a one-bit lookup table would direct the process to the array that would yield a more circular tint dot for the particular input. Thus, for example, the first array would be selected for a four-pixel dot and the second array would be selected for a five-pixel dot.

Such a system would not need the large look up tables for providing a typical set of tint dot bit patterns, but could be limited to a circuit for processing Holladay arrays only. For ordinary pictorial use, one array would be used, and for tint dots, two arrays would be used.

In fact, the two-array system can also be used to advantage for pictorial material. Here also, two arrays to choose from will give the system a better opportunity to pick a pattern, for each level of coverage, in which the peripheral pixels interfere with each other minimally, thereby improving image quality.

DETAILED DESCRIPTION OF THE INVENTION

Figure 1:
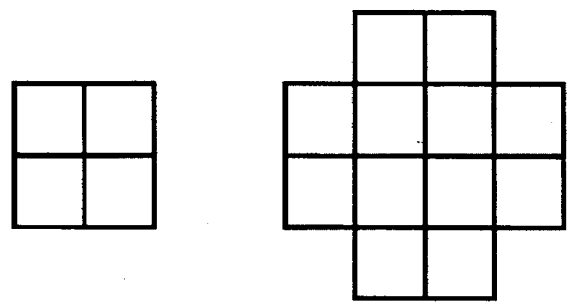
FIG. 1 contains examples of Interstice-centered growth.
Figure 2:
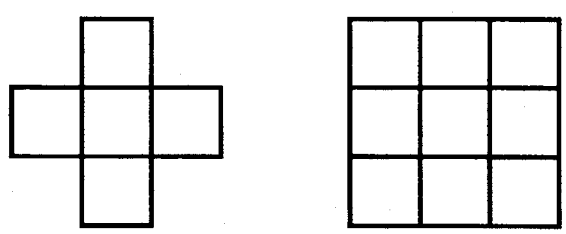
FIG. 2 contains examples of pixel-centered growth.

In the process of selecting patterns for use in this two-array system, it was found that good patterns for the highlights could be inverted and used in the shadow regions. Also, two basic sets of stable patterns, those centered on the interstice where 4 pixels touch, FIG. 1, and those centered on a pixel center, FIG. 2, could be used. By combination, two Holladay threshold arrays can be used, one with pixel-centered growth and circular spots well past 50% area coverage, and the other with interstice-centered growth and circular white holes starting well before 50% coverage. A 256-entry 1-bit look-up table can map all possible input values into one or the other array.

This switching accomplishes two different goals. In the highlight and in the shadow regions the switching will be primarily between pixel-center vs interstice-center growth, providing a greater number of usable symmetric or noise-free levels. In the mid-tones, this switching will enable the reversal from circular spots to circular holes. Fortunately, there is less need for switching in the midtones where the dots can more easily be symmetric because there are more pixels in the boundary region.

Figure 3:
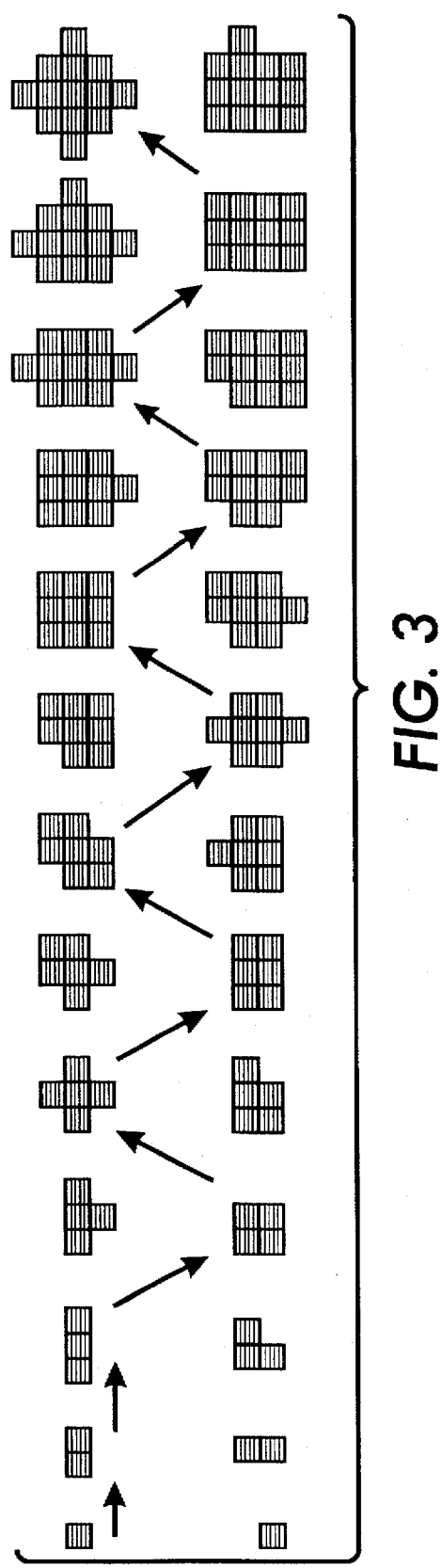
FIG. 3 shows tint dot growth for light densities.

FIG. 3 shows a possible highlight growth sequence and switching. Here it is rapidly switching between the two types of dots in order to retain the best levels.

Figure 4:
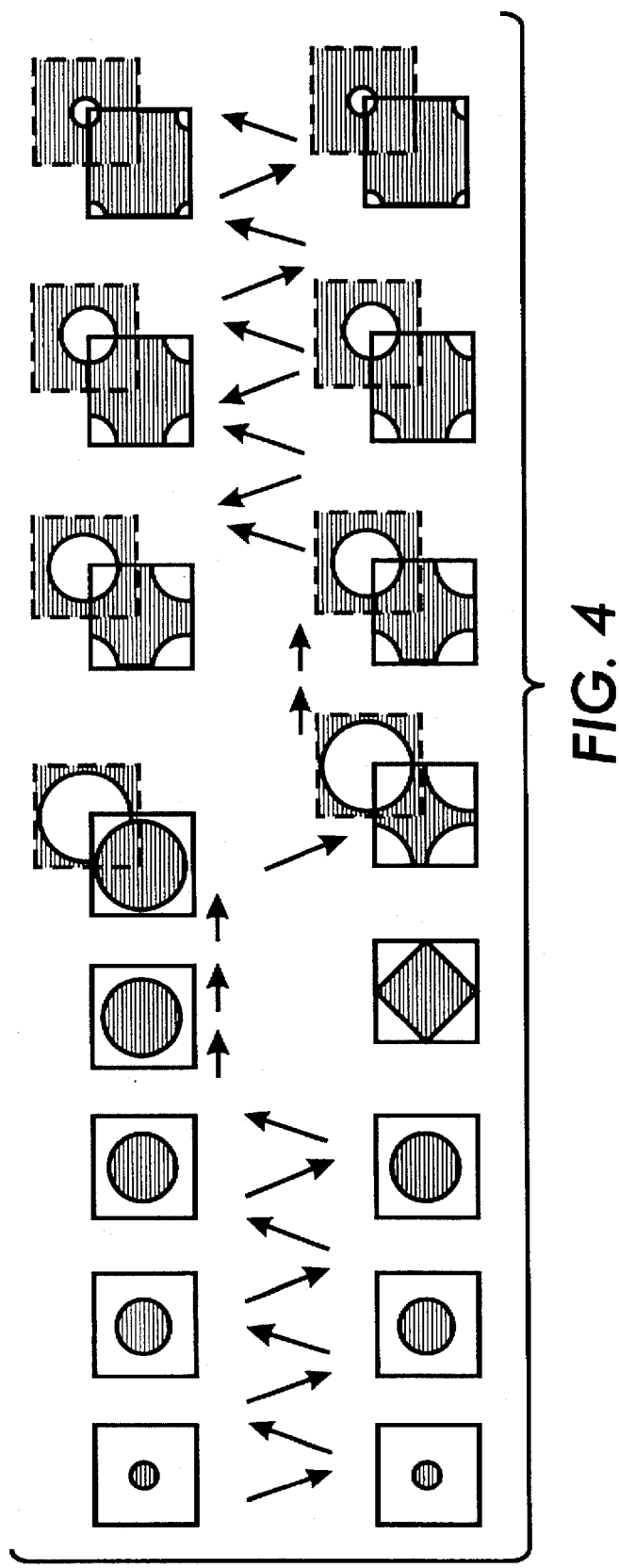
FIG. 4 is an overview of switching strategy.

FIG. 4 shows the overview of the entire growth sequence. Here it can be seen that there is only one switch in the mid-tones, that is the switch from spots to holes. In the mid-tone region it is not possible to switch back and forth because only one of the two dots is circular. The other dot is changing from spots to holes or vice versa and is not usable during that transition.

Although the illustrations show a zero-degree screen, since these are Holladay dots they can be at any rational-tangent angle and size.

Figure 5:
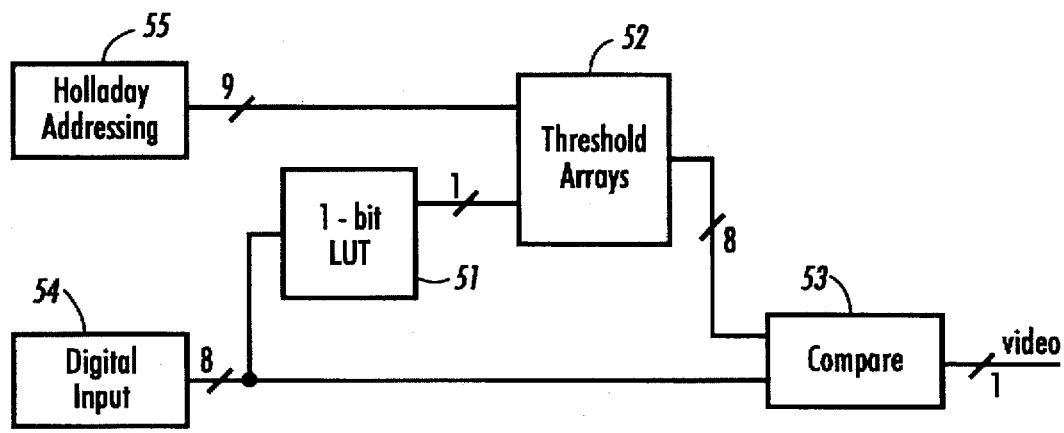
FIG. 5 is a diagram of the preferred architecture.

FIG. 5. shows a circuit diagram or flow diagram for the invention. Two threshold arrays are stored in memory 52. The digital image input from a generator 54 which is a function of the desired toner coverage or density of the current pixel is applied to the LUT (look up table) 51 which decides which of the two arrays will be used by outputting one address bit to the memory 52. The position of the current pixel on the page is supplied by the Holladay address generator 55 as the remainder of the addressing to the memory 52 and its output is a digital threshold level which is compared at comparator 53 against the image input to produce an output 1 or 0 bit.

Figure 6:
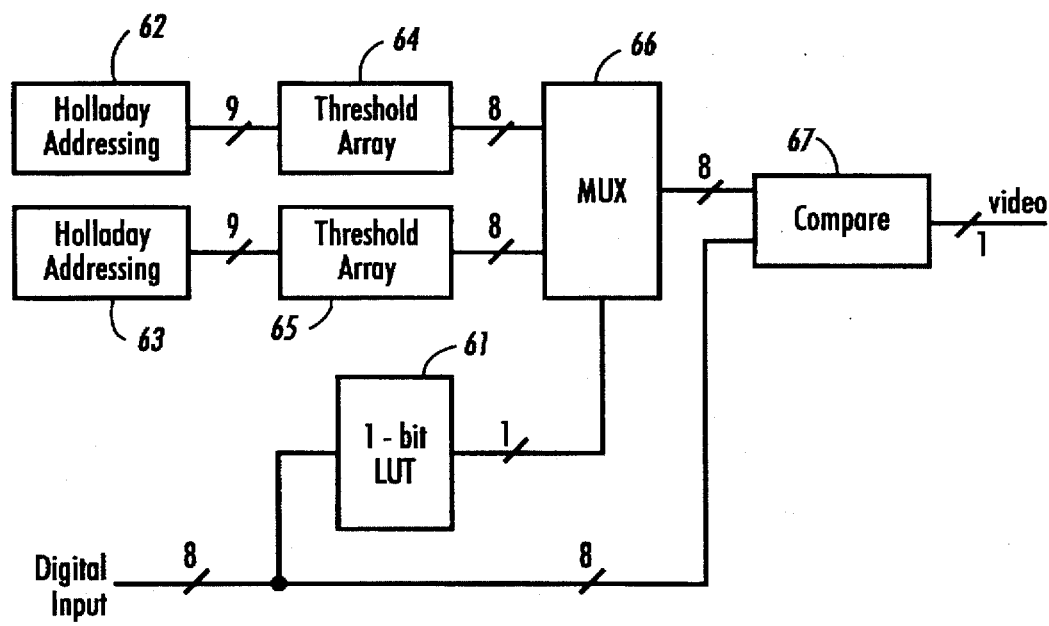
FIG. 6 is an alternate architecture.

An alternative is shown in FIG. 6 where there are two arrays 64, 65 addressed by the position of the current pixel on the page, each of which outputs a threshold. The image input addresses the LUT 61 which controls the Mux (multiplexer) 66 to select one of the two array outputs which is compared to the image input at comparator 67, resulting in the one-bit output. The point of this figure is that the two channels, one comprising the Holladay address generator 62, and array 64, the other comprising the address generator 63 and the array 65, need not be similar. The two channels may differ in dot size, frequency and screen angle, number of centers, etc. The point is that one channel can be optimized for one print characteristic, the other channel optimized for a different characteristic, and the LUT 61 is free to choose the better of the two for the particular color and coverage currently being printed.

Figure 7:
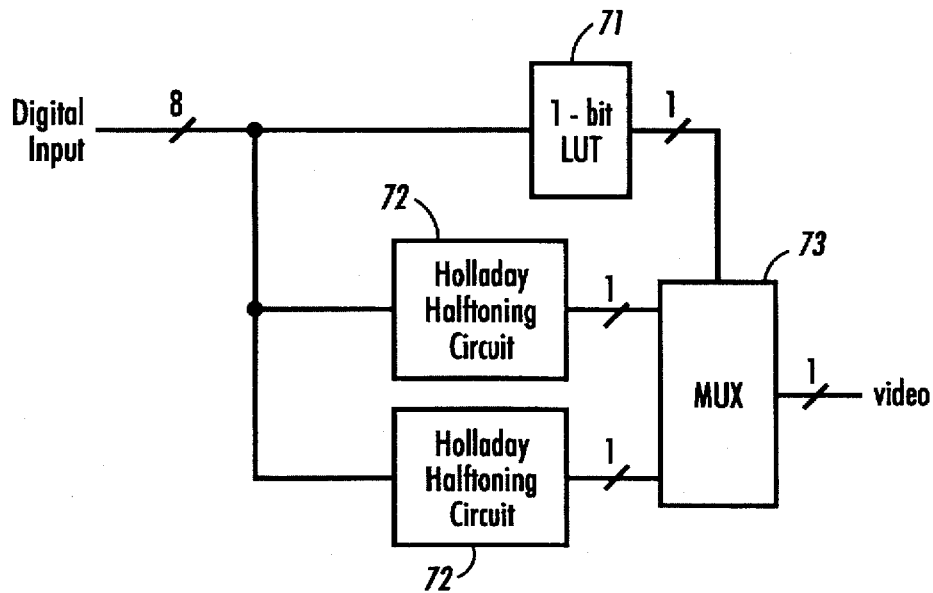
FIG. 7 is another alternate architecture.

A variation of the circuit of FIG. 6 is shown in FIG. 7. Here two circuits 72 as shown in FIG. 5 are running in parallel, and a LUT 71 and multiplexer 73 decides which output to use.

Figure 8:
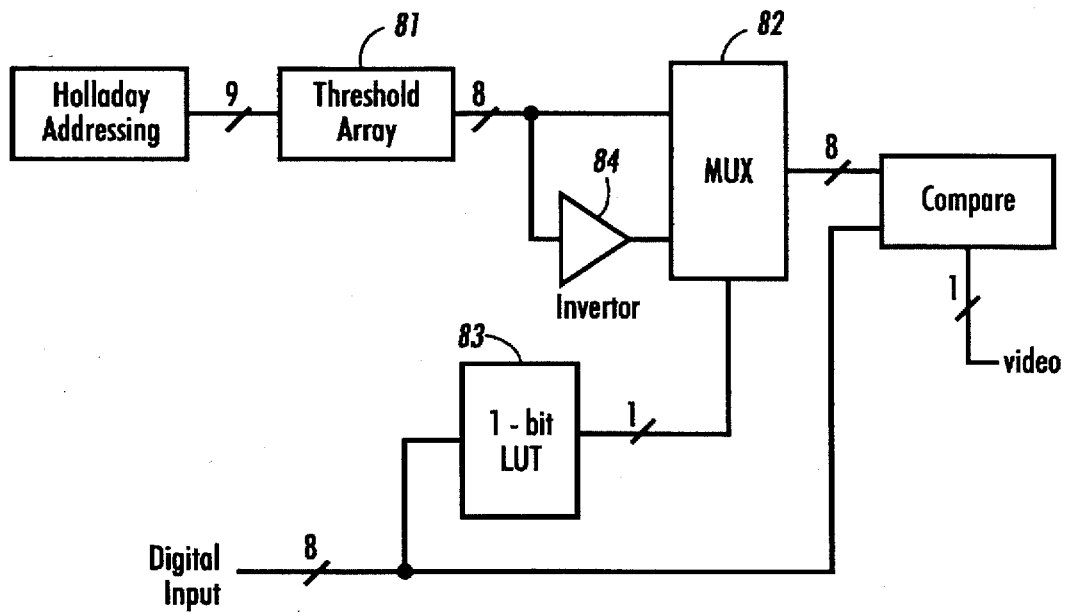
FIG. 8 is an alternate architecture using a single array.

FIG. 8 is an architecture in which it is possible to utilize only one threshold array, further reducing the extra memory requirements. In this case, the single array 81 could have, for example, interstice-centered growth in the highlights and pixel-centered growth in the shadows. In this example, a threshold which would form a 4-pixel interstice-centered dot would be accessed directly from the array, while a threshold which would form a 5-pixel pixel-centered dot would be accessed from the upper end of the same array and inverted 84 to form the pattern. The one-bit look-up table 83, responsive to the digital input, would control a multiplexer 82 which would select either the normal threshold values or inverted threshold values. By using this system, the same benefits described with respect to the two-array system can be achieved, with the exception that the centeredness of the dots would change phase with each switch. However, for tint dots there is less need for the dot levels to have the same phase relationship since it is assumed that the digital input will remain constant over the area to be printed.

Inverting the thresholds for a midtone value will result in a hole instead of a spot, so the black dot growth would stay circular beyond 50% area coverage and then transition to circular white holes. By using an inverted threshold to produce a black dot highlight value, a spot would be produced but with the phase and growth strategy of the original white hole. In this method the dot growth strategy would need to be a compromise between patterns that work well in highlight regions vs shadow regions since the same patterns would be used in both regions, but much symmetry between highlight and shadow growth has been used successfully in the past.

Figure 9:
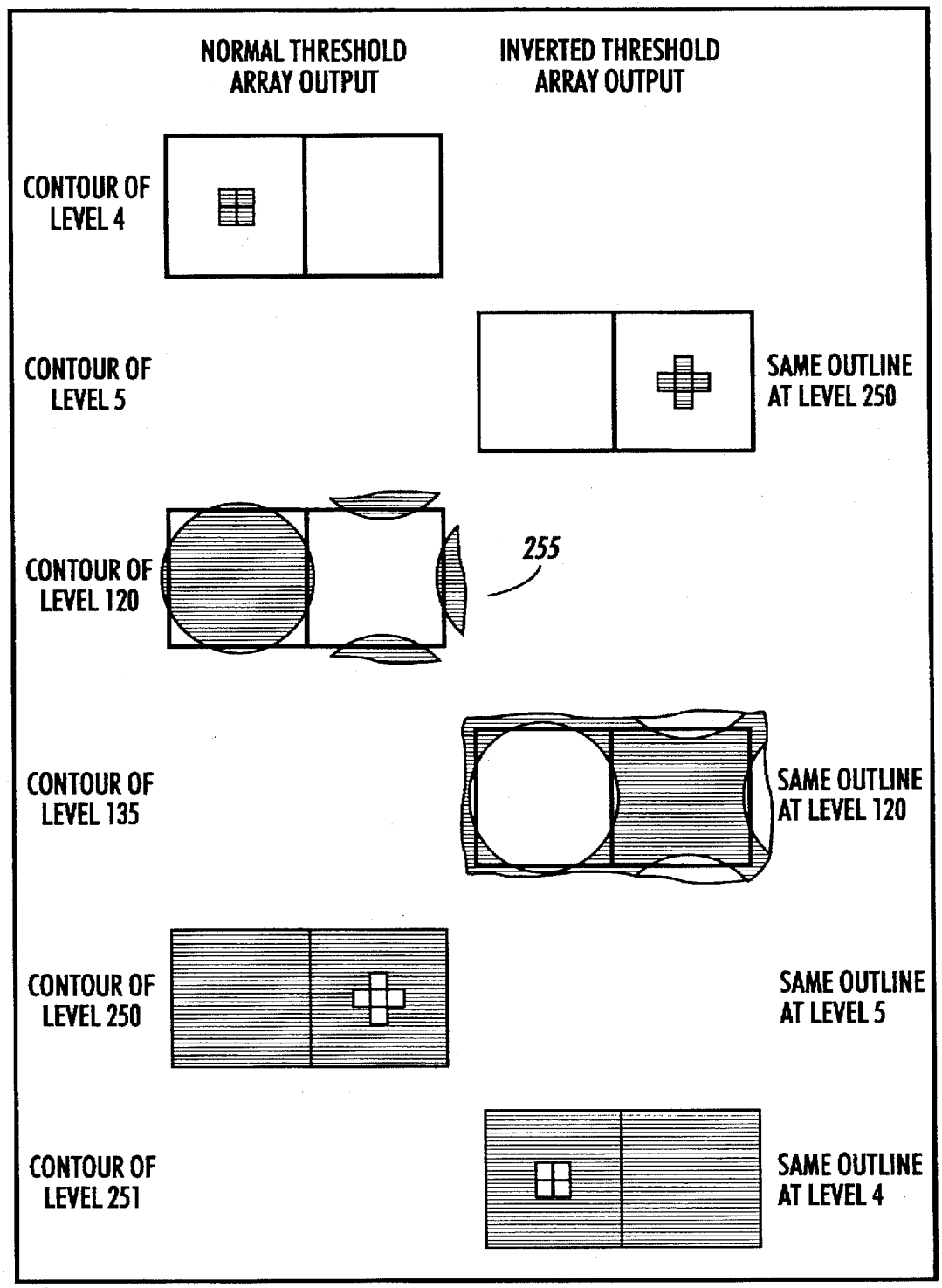
FIG. 9 is a pictorial description of the single-array embodiment.

This one-array circuit can be explained pictorially with reference to FIG. 9. Assuming a digital input value of 4, threshold levels to produce a black dot having a contour of level 4 would be accessed directly from the array. For a contour of level 5, the threshold value of level 250 would be accessed and inverted to form a 5-pixel black dot. For a lighter mid-level of 120, a threshold value would be accessed directly from the array to form a large black dot while for a darker mid-level of 135, a threshold value would be accessed from the array and inverted to form a large white hole. Finally, for a contour of 250 the value would be accessed directly from the array to form a pixel-centered hole while for 251 an inverted value would be used to form an interstice-centered hole.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A halftone generator comprising:

image means for generating an image signal which is a function of coverage of the current pixel, address means for generating an address signal of the position of the current pixel, threshold means comprising one or two threshold arrays responsive to the address and the image signal, for generating a threshold signal which will produce either an interstice-centered dot, a pixel-centered dot, an interstice-centered hole or a pixel-centered hole, and a comparator for comparing the image signal and the threshold signal to produce a portion of a halftone pattern.

2. The generator of claim 1 wherein the threshold means comprises two arrays, one for generating a pixel-centered dot and one for generating an interstice-centered dot, and means responsive to the image signal for selecting one for the input to the comparator.

3. The generator of claim 2 wherein the address means comprises two address generators, one for each array.

4. The generator of claim 1 wherein the threshold means comprises one array of threshold values, one end of the array storing thresholds which will produce pixel-centered dots, the other end storing thresholds which will produce interstice-centered patterns, the array being responsive to the address signal for outputting one threshold signal, an inverter for inverting the output of the array, and a multiplexer means responsive to the image signal for selecting either the output or the inverted output of the array to be sent to the comparator.

* * * * *